United States Patent
Michaelis et al.

(10) Patent No.: US 7,308,566 B2
(45) Date of Patent: Dec. 11, 2007

(54) SYSTEM AND METHOD FOR CONFIGURING LOCKSTEP MODE OF A PROCESSOR MODULE

(75) Inventors: Scott L. Michaelis, Plano, TX (US); Anurupa Rajkumari, Round Rock, TX (US); William B. McHardy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 10/973,004

(22) Filed: Oct. 25, 2004

(65) Prior Publication Data

US 2006/0107117 A1 May 18, 2006

(51) Int. Cl.
G06F 9/00 (2006.01)
G06F 15/177 (2006.01)
G06F 1/24 (2006.01)

(52) U.S. Cl. .............................. 713/1; 713/2; 713/100

(58) Field of Classification Search ................ 713/1, 713/2, 100
See application file for complete search history.

(56) References Cited

U.S. PATENT DOCUMENTS

| | | | | |
|---|---|---|---|---|
| 4,358,823 | A | * | 11/1982 | McDonald et al. ........... 714/11 |
| 5,226,152 | A | | 7/1993 | Klug et al. |
| 5,249,188 | A | | 9/1993 | McDonald |
| 5,675,794 | A | * | 10/1997 | Meredith ........................ 713/1 |
| 5,751,932 | A | | 5/1998 | Horst et al. |
| 5,758,058 | A | | 5/1998 | Milburn |
| 5,764,660 | A | | 6/1998 | Mohat |
| 6,065,135 | A | | 5/2000 | Marshall et al. |
| 6,148,348 | A | | 11/2000 | Garnett et al. |
| 6,438,687 | B2 | * | 8/2002 | Klein ............................ 713/1 |
| 6,473,869 | B2 | | 10/2002 | Bissett et al. |
| 6,560,682 | B1 | | 5/2003 | Miller et al. |
| 6,604,177 | B1 | | 8/2003 | Kondo et al. |
| 6,615,366 | B1 | | 9/2003 | Grochowski et al. |
| 6,625,749 | B1 | | 9/2003 | Quach |
| 6,687,851 | B1 | | 2/2004 | Somers et al. |
| 6,754,787 | B2 | | 6/2004 | Miller et al. |
| 6,920,581 | B2 | * | 7/2005 | Bigbee et al. ................. 714/10 |
| 2002/0144177 | A1 | | 10/2002 | Kondo et al. |
| 2003/0070050 | A1 | | 4/2003 | Miller et al. |
| 2004/0006722 | A1 | | 1/2004 | Safford |
| 2004/0019771 | A1 | | 1/2004 | Quach |
| 2004/0153857 | A1 | | 8/2004 | Yamazaki et al. |

OTHER PUBLICATIONS

Filed concurrently herewith, entitled "System and Method for Maintaining in a Multi-Processor System a Spare Processor That is in Lockstep for Use in Recovering From Loss of Lockstep for Another Processor".

(Continued)

*Primary Examiner*—Thomas Lee
*Assistant Examiner*—Ji H Bae (57) ABSTRACT

A system comprises a processor module that supports lockstep mode of operation. The system further comprises non-volatile data storage having stored thereto configuration information specifying whether the processor module is desired to operate in lockstep mode. A method comprises storing configuration information to non-volatile data storage of a system, wherein the configuration information specifies whether lockstep mode of operation is desired to be enabled or disabled for a processor module of the system. The method further comprises causing, by the system, the processor module to have its lockstep mode enabled or disabled as specified by the configuration information.

25 Claims, 3 Drawing Sheets

OTHER PUBLICATIONS

Filed concurrently herewith, entitled "System and Method for Establishing a Spare Processor for Recovering From Loss of Lockstep in a Boot Processor".

Filed concurrently herewith, entitled "System and Method for Using Information Relating to a Detected Loss of Lockstep for Determining a Responsive Action".

Filed concurrently herewith, entitled "System and Method for Providing Firmware Recoverable Lockstep Protection".

Filed concurrently herewith, entitled "System and Method for Switching the Role of Boot Processor to a Spare Processor Responsive to Detection of Loss of Lockstep in a Boot Processor".

Filed concurrently herewith, entitled "System and Method for Reestablishing Lockstep for a Processor Module for Which Loss of Lockstep is Detected".

Filed concurrently herewith, entitled "System and Method for System Firmware Causing an Operating System to Idle a Processor".

Filed concurrently herewith, entitled "System and Method for Reintroducing a Processor Module to an Operating System After Lockstep Recovery".

* cited by examiner

SYSTEM AND METHOD FOR CONFIGURING LOCKSTEP MODE OF A PROCESSOR MODULE

CROSS-REFERENCE TO RELATED APPLICATIONS

The present application is related to the following concurrently filed and commonly assigned U.S. patent applications: Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR"; Ser. No. 10/972,835 titled "SYSTEM AND METHOD FOR USING INFORMATION RELATING TO A DETECTED LOSS OF LOCKSTEP FOR DETERMINING A RESPONSIVE ACTION"; Ser. No. 10/973,076 titled "SYSTEM AND METHOD FOR PROVIDING FIRMWARE RECOVERABLE LOCKSTEP PROTECTION"; Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR"; Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED"; Ser. No. 10/972,888 titled "SYSTEM AND METHOD FOR SYSTEM FIRMWARE CAUSING AN OPERATING SYSTEM TO IDLE A PROCESSOR"; Ser. No. 10/973,075 titled "SYSTEM AND METHOD FOR REINTRODUCING A PROCESSOR MODULE TO AN OPERATING SYSTEM AFTER LOCKSTEP RECOVERY"; and Ser. No. 10/972,796 titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosures of which are hereby incorporated herein by reference.

DESCRIPTION OF RELATED ART

Silent Data Corruption ("SDC") is a difficult problem in the computing industry. In general, SDC refers to data that is corrupt, but which the system does not detect as being corrupt. SDCs primarily occur due to one of two factors: a) a broken hardware unit or b) a "cosmic" event that causes values to change somewhere in the system. Broken hardware means that a "trusted" piece of hardware is silently giving wrong answers. For example, the arithmetic unit in a processor is instructed to add 1+1 and it returns the incorrect answer 3 instead of the correct answer 2. An example of a cosmic event is when a charged particle (e.g., alpha particle or cosmic ray) strikes a region of a computing system and causes some bits to change value (e.g., from a 0 to a 1 or from a 1 to a 0).

Numerous techniques have been developed for detecting SDC to prevent the SDC from remaining "silent" or "undetected" within a system, as well as preventing such SDC from propagating through the system. Examples of these techniques include parity-based mechanisms and error correcting codes (ECCs) on buses and memory locations, as well as checksums and/or cyclic redundancy checks (CRC) over regions of memory. Parity-based mechanisms are often employed in processors, wherein a parity bit is associated with each block of data when it is stored. The parity bit is set to one or zero according to whether there is an odd or even number of ones in the data block. When the data block is read out of its storage location, the number of ones in the block is compared with the parity bit. A discrepancy between the values indicates that the data block has been corrupted. ECCs are parity-based mechanisms that track additional information for each data block. The additional information allows the corrupted bit(s) to be identified and corrected.

Parity/ECC mechanisms have been employed extensively for caches, memories, and similar data storage arrays. In the remaining circuitry on a processor, such as data paths, control logic, execution logic, and registers (the "execution core"), it is more difficult to apply parity/ECC mechanisms for SDC detection. Thus, there is typically some unprotected area on a processor in which data corruption may occur and the parity/ECC mechanisms do not prevent the corrupted data from actually making it out onto the system bus. One approach to SDC detection in an execution core (or other unprotected area of the processor chip) is to employ "lockstep processing." Generally, in lockstep processing two processors are paired together, and the two processors perform exactly the same operations and the results are compared (e.g., with an XOR gate). If there is ever a discrepancy between the results of the lockstep processors, an error is signaled. The odds of two processors experiencing the exact same error at the exact same moment (e.g., due to a cosmic event occurring in both processors at exactly the same time or due to a mechanical failure occurring in each processor at exactly the same time) is nearly zero.

A pair of lockstep processors may, from time to time, lose their lockstep. "Loss of lockstep" (or "LOL") is used broadly herein to refer to any error in the pair of lockstep processors. One example of LOL is detection of data corruption (e.g., data cache error) in one of the processors by a parity-based mechanism and/or ECC mechanism. Another example of LOL is detection of the output of the paired processors not matching, which is referred to herein as a "lockstep mismatch." It should be recognized that in some cases the data in the cache of a processor may become corrupt (e.g., due to a cosmic event), which once detected (e.g., by a parity-based mechanism or ECC mechanism of the processor) results in LOL. Of course, unless such corrupt data is acted upon by the processor, the output of that processor will not fail to match the output of its paired processor and thus a "lockstep mismatch" will not occur. For example, suppose that a value of "1" is stored to first location of cache in each of a pair of lockstep processors and a value of "1" is also stored to a second location of cache in each of the pair of lockstep processors. Further suppose that a cosmic event occurs for a first one of the processors, resulting in the first location of its cache being changed from "1" to "0", and thus corrupted. This data corruption in the first processor is a LOL for the pair. An error detection mechanism of this first processor may detect the data corruption, thus detecting the LOL. If the processors are instructed to act on the data of their first cache locations, then a lockstep mismatch will occur as the output of each of the processors will not match. For instance, if the processors each add the data stored to the first location of their respective cache with the data stored to the second location of their respective cache, the first processor (having the corrupt data) will output a result of "1" (0+1=1) while the second processor outputs a result of "2" (1+1=2), and thus their respective-outputs will not match.

By employing such techniques as parity-based error detection mechanisms and output comparisons for lockstep paired processors, SDC detection can be enhanced such that practically no SDC occurring in a processor goes undetected (and thus such SDC does not remain "silent") but instead results in detection of LOL. Traditionally, a pair of processors are configured in hardware as either a lockstep pair of processors (that process instructions in lockstep) or separate processors that do not execute in lockstep. For instance, a "permanent" method has traditionally been used to turn on or off lockstep on a processor pair. An example of such a permanent method is a fuse setting in the processor module that is set at the factory to configure the processor module to operate in lockstep mode, or fabricating the chip such that the processor module always runs in lockstep mode. Thus, in traditional systems, a system administrator has not had the flexibility to configure (e.g., via a user interface) whether a pair of processors in the system are to operate in lockstep or not. That is, prior systems do not adapt the processors' operation according to configuration settings stored to the system that specify whether the processors are to operate in lockstep or not.

BRIEF SUMMARY OF THE INVENTION

According to one embodiment, a system comprises a processor module that supports lockstep mode of operation. The system further comprises non-volatile data storage having stored thereto configuration information specifying whether the processor module is desired to operate in lockstep mode.

According to one embodiment, a system comprises a processor module that is configurable to have a lockstep mode of operation enabled or disabled. The system further comprises means for storing configuration information that specifies whether lockstep mode of operation is desired to be enabled or disabled for the processor module. The system further comprises means for configuring the processor module to have its lockstep mode of operation enabled or disabled according to the configuration information.

According to one embodiment, a method comprises storing configuration information to non-volatile data storage of a system, wherein the configuration information specifies whether lockstep mode of operation is desired to be enabled or disabled for a processor module of the system. The method further comprises causing, by the system, the processor module to have its lockstep mode enabled or disabled as specified by the configuration information.

According to one embodiment, a method comprises storing configuration information to non-volatile data storage of a system, wherein the configuration information specifies whether lockstep mode of operation is desired to be enabled for a processor module of the system. The method further comprises, during boot-up of the system, system firmware determining whether the processor module has its lockstep mode of operation configured consistent with the configuration information, and, if determined that the processor module is not configured consistent with the configuration information, the firmware causing the processor module to change its lockstep mode configuration.

DETAILED DESCRIPTION OF THE INVENTION

Figure 1:
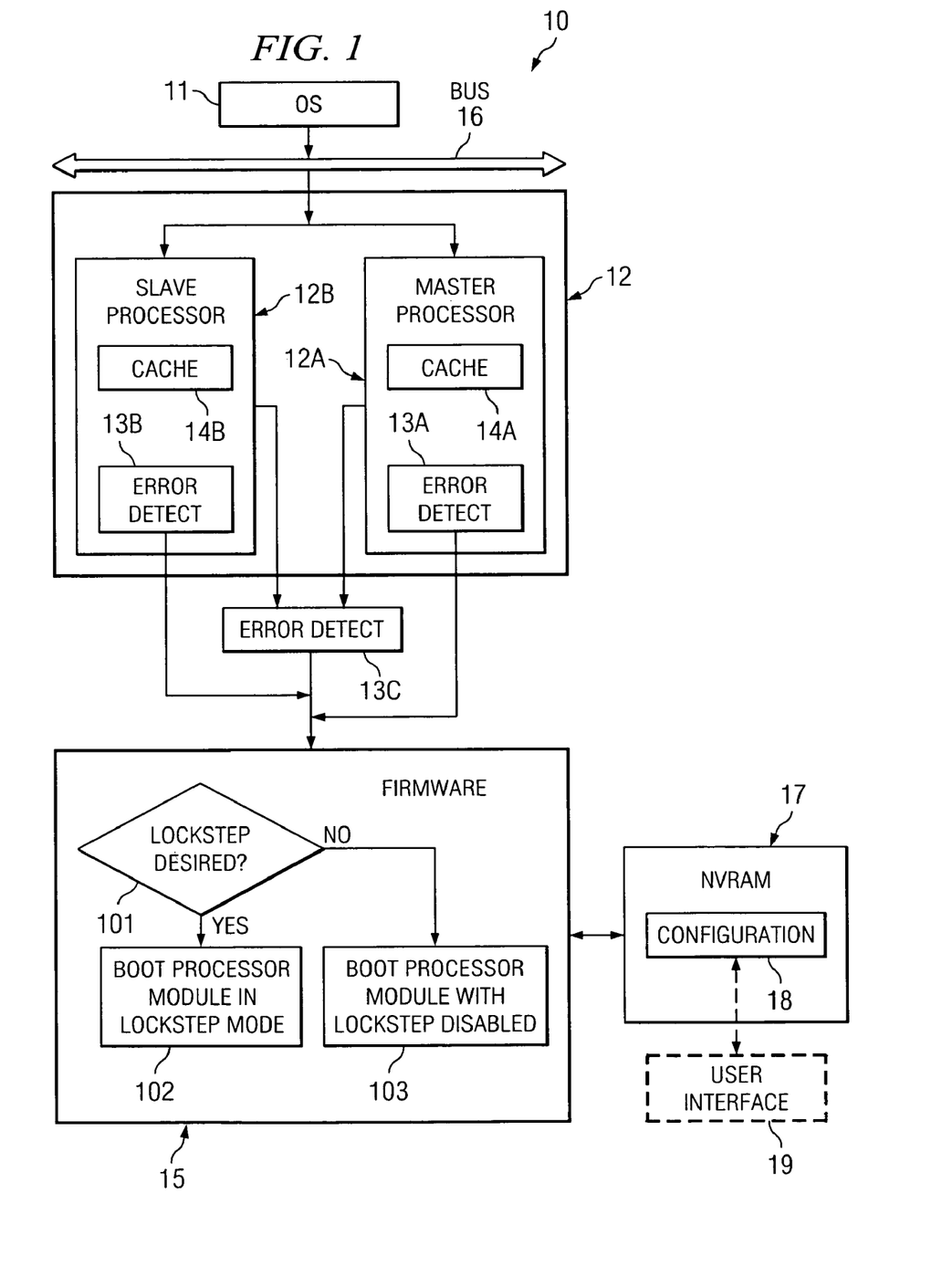
FIG. 1 shows an example embodiment of a system that has configuration settings stored to non-volatile data storage that are used for determining whether the system's processors are to be configured in lockstep mode.

Turning to FIG. 1, an example embodiment of a system 10 is shown, which has configuration settings stored to non-volatile data storage that are used for determining whether the system's processors are to be configured in lockstep mode. As described further herein, the configuration settings may be modified by a system administrator, thus allowing the system administrator to configure the mode of operation of the processors as desired. In certain embodiments, a system may be partitioned, and the system administrator may specify that processors of a first partition are to operate in lockstep mode, while processors of another partition are not to operate in lockstep mode. The system firmware accesses the configuration settings during the system's boot-up process to determine whether the processors are configured to operate in lockstep mode, and the firmware boots the processors in the desired operating mode (e.g., either with lockstep enabled or lockstep disabled).

System 10 includes OS 11, as well as master processor 12A and slave processor 12B (collectively referred to as a lockstep processor pair 12). In certain implementations the lockstep processor pair 12 may be implemented on a single silicon chip, which is referred to as a "dual core processor" in which master processor 12A is a first core and slave processor 12B is a second core. Further, lockstep processor pair 12 may be referred to as a processor or CPU "module" because it includes a plurality of processors (12A and 12B) in such module.

Master processor 12A includes cache 14A, and slave processor 12B includes cache 14B. OS 11 and lockstep processor pair 12 are communicatively coupled to bus 16. Typically, master processor 12A and slave processor 12B are coupled to bus 16 via an interface that, if lockstep mode is enabled for processor module 12, allows each of such processors to receive the same instructions to process, but such interface only communicates the output of master processor 12A back onto bus 16. When lockstep mode is enabled for processor module 12, the output of slave processor 12B is used solely for checking the output of mater processor 12A. While only one processor module 12 is shown for simplicity in the example of FIG. 1, system 10 may include any number of such processor modules. As one specific example, in one implementation system 10 includes 64 processor modules. If lockstep mode is enabled for the 64 processor modules, the master processors of the modules perform parallel processing for the system.

If lockstep mode is disabled for module 12, then processors 12A and 12B may operate as individual processors that are each available for receiving separate instructions to process. Accordingly, even though processors 12A and 12B are referred to herein as "master" and "slave," this relationship only exists if lockstep mode is enabled for the processor module 12. When lockstep mode is disabled, processors 12A and 12B have equal status, and may each operate as a "master" with no slave. Thus, if in the above-mentioned implementation in which system 10 includes 64 processor modules, if lockstep mode is disabled for the 64 processor modules, 128 total processors may be available for performing parallel processing for the system.

In the example shown in FIG. 1, master processor 12A includes error detect logic 13A, and slave processor 12B includes error detect logic 13B. While shown as included in each of the processors 12A and 12B in this example, in certain embodiments the error detect logic 13A and 13B may be implemented external to processors 12A and 12B. Error detect logic 13A and 13B include logic for detecting errors, such as data cache errors, present in their respective processors 12A and 12B. Examples of error detect logic 13A and 13B include known parity-based mechanisms and ECC mechanisms. Error detect logic 13C (which may be referred to as "lockstep mismatch detection logic") is also included, which may include an XOR (exclusive OR) gate, for detecting a lockstep mismatch between master processor 12A and slave processor 12B. As mentioned above, a lockstep mismatch refers to the output of master processor 12A and slave processor 12B failing to match. While shown as external to the lockstep processor pair 12 in this example, in certain embodiments error detect logic 13C may be implemented on a common silicon chip with processors 12A and 12B.

Lockstep mismatch is one way of detecting a LOL between the master processor 12A and slave processor 12B. A detection of an error by either of error detect logic 13A and 13B also provides detection of LOL in the processors 12A and 12B. Because the detection of LOL by error detect logic 13A and 13B may occur before an actual lockstep mismatch occurs, the detection of LOL by error detect logic 13A and 13B may be referred to as a detection of a "precursor to lockstep mismatch". In other words, once an error (e.g., corrupt data) is detected by error detect logic 13A or 13B, such error may eventually propagate to a lockstep mismatch error that is detectable by error detect logic 13C.

If lockstep mode is enabled for processor module 12, error detect logic 13C is activated to detect occurrences of lockstep mismatches. Also, in lockstep mode, error detect logic 13A and 13B are active for detecting errors, such as data cache errors, within master processor 12A and slave processor 12B, respectively. If lockstep mode is disabled for processor module 12, error detect logic 13C is de-activated, and thus occurrences of lockstep mismatches are not detected. Error detect logic 13C may be de-activated in many ways, but the overall effect is that a mismatch in the output of processors 12A and 12B does not result in an error for processor module 12. Of course, error detect logic 13A and 13B may still be active even if lockstep is disabled for processor module 12 to enable errors (e.g., parity errors) occurring within master processor 12A or slave processor 12B to be detected for those individual processors. Thus, when lockstep mode is disabled, errors within processor 12A that are not detected by error detect logic 13A go unnoticed, and similarly errors within processor 12B that are not detected by error detect logic 13B go unnoticed. However, if lockstep mode is enabled, error detect logic 13C detects lockstep mismatches between master processor 12A and slave processor 12B even if the error detect logic of the processor in which the error occurred (e.g., error detect logic 13A of master processor 12A) fails to detect an error, and thus enabling lockstep further reduces the chances of silent data corruption occurring.

In some instances, it may be desirable to disable lockstep mode for certain processors (or at certain times) and enable lockstep mode for certain other processors (or at certain other times). As an example, a system may be partitioned into a plurality of partitions, where each partition includes one or more processor modules. In this case, if desired, a first partition may be configured to use lockstep mode, and another partition may be configured such that its processor module(s) do not use lockstep mode processing. For instance, a first partition may be implemented for supporting a web server, in which SDC is not a critical concern. Thus, lockstep mode of operation may be disabled for the processor module(s) of this first partition, thereby increasing the computing resources available on that partition. Another partition may implement a transaction server, in which case SDC is a greater concern. Thus, lockstep mode of operation may be enabled for the processor module(s) of this other partition to provide greater protection against SDC.

Firmware 15 is also included in system 10, which in this embodiment is used to determine the desired mode (lockstep enabled or lockstep disabled) for the processor module 12 and boot the processor module 12 in the desired mode. In this example, firmware 15 determines the desired mode based on configuration information 18 stored to non-volatile data storage, which in this example is non-volatile random access memory (NVRAM). Accordingly, configuration information 18 specifies whether lockstep mode is to be enabled or disabled for processor module 12. In certain embodiments, a user interface 19 is provided, which enables a system administrator to input the configuration information 18.

In the illustrated embodiment, when system 10 is booting up, firmware 15 determines in operational block 101 whether lockstep mode is desired for processor module 12. This determination is made based on the configuration information 18. Firmware 15 can likewise determine the desired operating mode for any other processor modules included in system 10. If determined from configuration information 18 in block 101 that lockstep mode is desired for processor module 12, firmware 15 triggers the appropriate actions in block 102 to boot up processor module 12 with lockstep mode enabled. If determined from configuration information 18 in block 101 that lockstep mode is not desired for processor module 12, firmware 15 triggers the appropriate actions in block 103 to boot up processor module 12 with lockstep mode disabled.

In certain embodiments, processors 12A and 12B are processors from the Itanium Processor Family (IPF). IPF is a 64-bit processor architecture co-developed by Hewlett-Packard Company and Intel Corporation, which is based on Explicitly Parallel Instruction Computing (EPIC). IPF is a well-known family of processors. IPF includes processors such as those having the code names of MERCED, MCKINLEY, and MADISON. In addition to supporting a 64-bit processor bus and a set of 128 registers, the 64-bit design of IPF allows access to a very large memory (VLM) and exploits features in EPIC. While a specific example implementation of one embodiment is described below for the IPF architecture, embodiments of firmware for using information relating to a detected LOL for determining its responsive action(s) are not limited in application to an IPF architecture, but may be applied as well to other architectures (e.g., 32-bit processor architectures, etc.).

Processor architecture generally comprises corresponding supporting firmware, such as firmware 15 of system 10. For example, as described further below in conjunction with the specific example of FIG. 2, the IPF processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported. While shown as external to the processor module 12 in this example, in certain embodiments all or a portion of firmware 15 may be implemented on a common silicon chip with processors 12A and 12B.

Firmware 15 may be employed in a system such as described in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference. This referenced U.S. patent application provides techniques that may be utilized by firmware 15 for recovering, during system runtime (i.e., without crashing the system), from LOL detected for a processor. In certain embodiments, if lockstep mode is enabled for processor module 12, the firmware 15 may utilize the techniques disclosed in U.S. patent application Ser. No. 10/973,076 titled "SYSTEM AND METHOD FOR PROVIDING FIRMWARE RECOVERABLE LOCKSTEP PROTECTION" for recovering from a detected LOL for such processor module.

Figure 2:
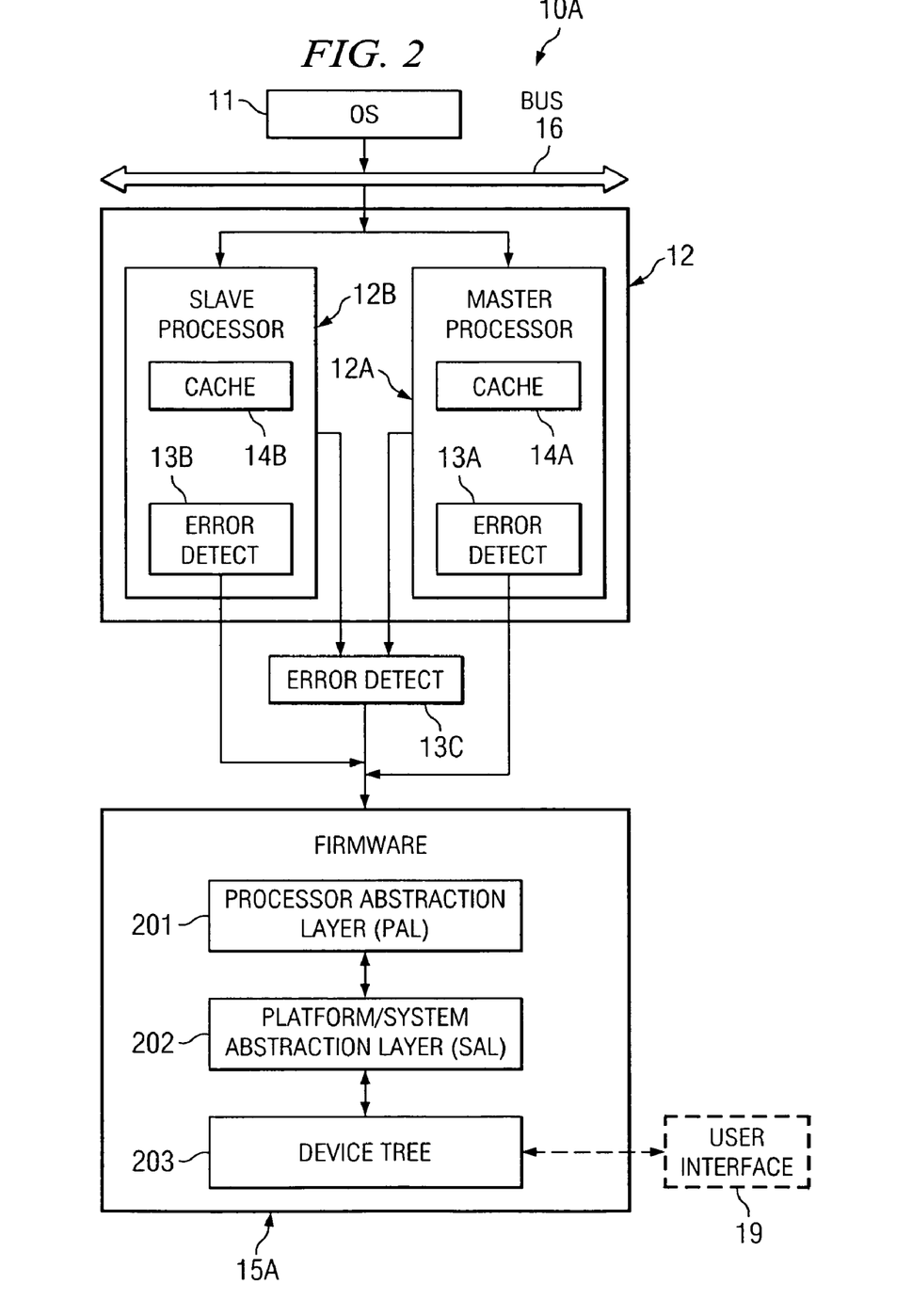
FIG. 2 shows a block diagram of one embodiment implemented for the IA-64 processor architecture.

FIG. 2 shows a block diagram of one embodiment of the above system 10, which is implemented for the IPF processor architecture and is labeled as system $10_A$. The quintessential model of the traditional IPF architecture is given in the *Intel IA-64 Architecture Software Developer's Manual, Volume 2: IA-64 System Architecture*, in section 11.1 *Firmware Model*, the disclosure of which is hereby incorporated herein by reference. Accordingly, in this example embodiment of system $10_A$, firmware 15, labeled as firmware $15_A$, includes processor abstraction layer (PAL) 201 and platform/system abstraction layer (SAL) 202. In general, PAL 201 is firmware provided by Intel for its processors, and SAL 202 is developed by an original equipment manufacturer (OEM) for the specific system/platform in which the processors are to be employed. PAL 201, SAL 202, as well as an extended firmware interface (EFI) layer (not shown), together provide, among other things, the processor and system initialization for an OS boot in an IPF system.

It should be noted that while the above description of PAL and SAL is specific to the IPF architecture, other architectures may include a "PAL" and "SAL" even though such firmware layers may not be so named or specifically identified as separate layers. In general, such a PAL layer may be included in a given system architecture to provide an interface to the processor hardware. The interface provided by the PAL layer is generally dictated by the processor manufacturer. Similarly, a SAL layer may be included in a given system architecture to provide an interface from the operating system to the hardware. That is, the SAL may be a system-specific interface for enabling the remainder of the system (e.g., OS, etc.) to interact with the non-processor hardware on the system and in some cases be an intermediary for the PAL interface.

The boot-up process of a traditional IPF system, for example, proceeds as follows: When the system is first powered on, there are some sanity checks (e.g., power on self-test) that are performed by microprocessors included in the system platform, which are not the main system processors that run applications. After those checks have passed, power and clocks are given to a boot processor (which may, for example, be master processor 12A). The boot processor begins executing code out of the system's Read-Only Memory (ROM) (not specifically shown in FIG. 2). The code that executes is the PAL 201, which gets control of system 10. PAL 201 executes to acquire all of the processors in system $10_A$ (recall that there may be many lockstep processor pairs 12) such that the processors begin executing concurrently through the same firmware.

After it has performed its duty of initializing the processor(s), PAL 201 passes control of system $10_A$ to SAL 202. It is the responsibility of SAL 202 to discover what hardware is present on the system platform, and initialize it to make it available for the OS 11. When main memory is initialized and functional, the firmware $15_A$ is copied into the main memory. Then, control is passed to EFI (not shown), which is responsible for activating boot devices, which typically includes the disk. The EFI reads the disk to load a program into memory, typically referred to as an operating system loader. The EFI loads the OS loader into memory, and then passes it control of system $10_A$ by branching the boot processor into the entry point of such OS loader program.

The OS loader program then uses the standard firmware interfaces to discover and initialize system $10_A$ further for control. One of the things that the OS loader typically has to do in a multi-processor system is to retrieve control of the other processors (those processors other than the boot processor). For instance, at this point in a multi-processor system, the other processors may be executing in do-nothing loops. In an ACPI-compatible system, OS 11 makes ACPI calls to parse the ACPI tables to discover the other processors of a multi-processor system in a manner as is well-known in the art. Then OS 11 uses the firmware interfaces to cause those discovered processors to branch into the operating system code. At that point, OS 11 controls all of the processors and the firmware $15_A$ is no longer in control of system $10_A$.

As OS 11 is initializing, it has to discover from the firmware $15_A$ what hardware is present at boot time. And in the ACPI standards, it also discovers what hardware is present or added or removed at run-time. Further, the supporting firmware (PAL, SAL, and EFI) are also used during system runtime to support the processor. For example, OS 11 may access a particular function of master processor 12A via the supporting firmware $15_A$, such as querying PAL 201 for the number, size, etc., of the processor's cache 14A. Some other well-known firmware functions that OS 11 may employ during runtime include: (a) PAL 201 may be invoked to configure or change processor features such as disabling transaction queuing (PAL_BUS_SET_FEATURES); (b) PAL 201 may be invoked to flush processor caches (PAL_CACHE_FLUSH); (c) SAL 202 may be invoked to retrieve error logs following a system error (SAL_GET_STATE_INFO, SAL_CLEAR_STATE_INFO); (d) SAL 202 may be invoked as part of hot-plug sequences in which new I/O cards are installed into the hardware (SAL_PCI_CONFIG_READ, SAL_PCI_CONFIG_WRIT); (e) EFI may be invoked to change the boot device path for the next time the system reboots (SetVariable); (f) EFI may be invoked to change the clock/calendar hardware settings; and (g) EFI may be invoked to shutdown the system (ResetSystem).

A "device tree" 203 is provided in this example. Device tree 203 is stored to NVRAM and includes the configuration information 18 described above. In this example, firmware 1 SA builds the device tree 203 as it discovers what hardware is installed in the system. Firmware then converts this information to the ACPI tables format and presents it to OS 11 so that OS 11 can know what is installed in the system.

According to certain embodiments, the device tree 203 specifies whether lockstep mode is enabled for the system's processors. For instance, in certain embodiments, a user (e.g., the system administrator can designate) via user interface 19 whether lockstep mode is to be enabled for the system's processors. Accordingly, rather than the processors included in a processor module (e.g., processors 12A and 12B of pair 12) being fixed as lockstep processors, according to certain embodiments if the lockstep mode is not enabled for those processors, the processors may each be presented to the OS (e.g., during the system boot-up process) as available resources, as opposed to the slave processor being used solely for redundant processing of instructions received by the master processor.

A simple example of device tree 203 is shown below in Table 1:

TABLE 1

| Device | Status | Lockstep Enabled |
|---|---|---|
| Processor Module A | Present, Enabled, and Functioning | Yes |
| Processor Module B | Present, Enabled, and Functioning | Yes |
| . . . | . . . | . . . |

During boot-up of the system, firmware 15A can access device tree 203 and determine which processor module(s) have lockstep enabled, and firmware 15A can thus ensure that the processor module(s) boot-up in the desired operating mode.

Figure 3:
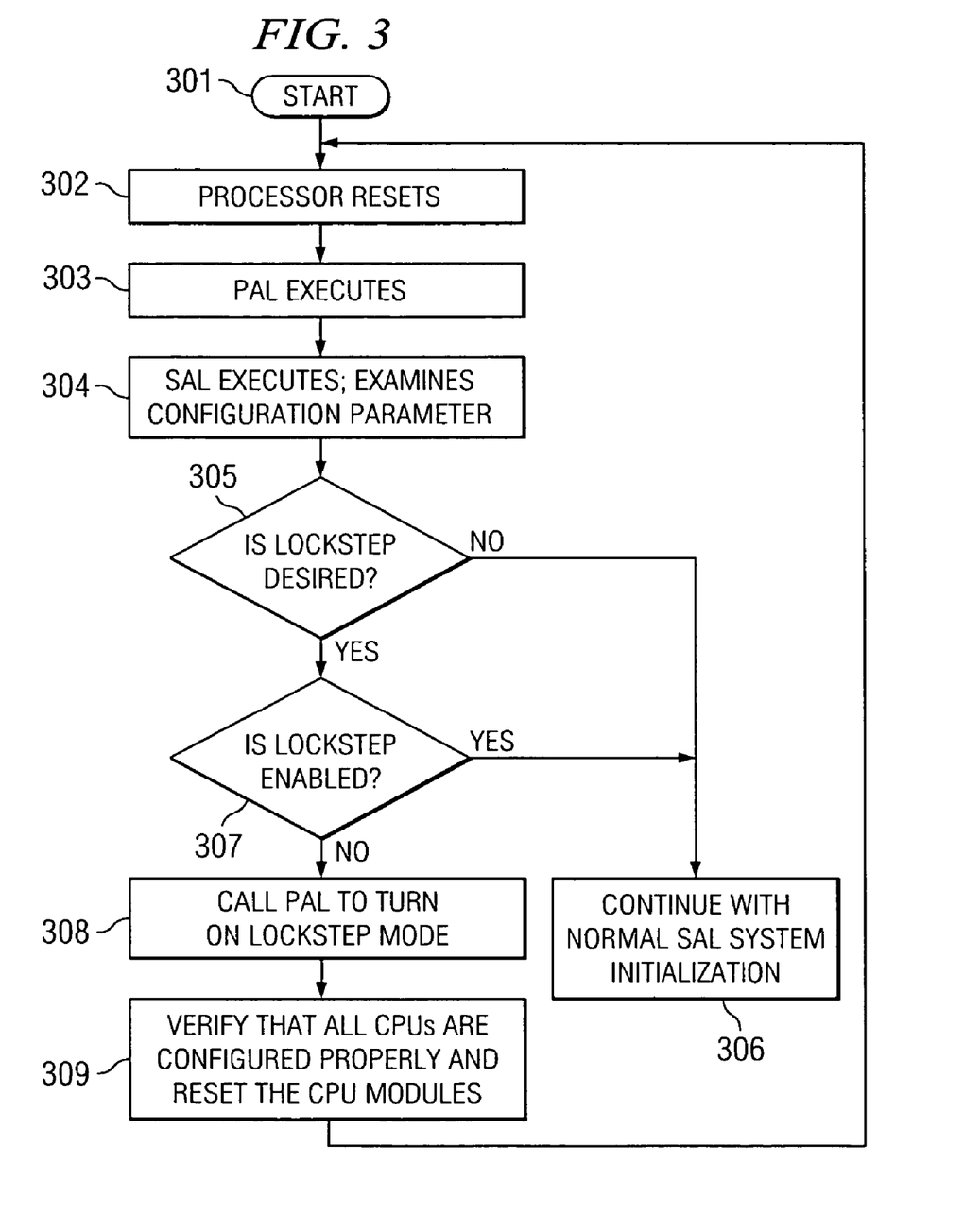
FIG. 3 shows an operational flow diagram according to one embodiment.

Turning to FIG. 3, an operational flow diagram according to one embodiment is shown. Operation starts in block 301, which may begin when a system is powered on or restarted, as examples. Thus, block 301 starts the boot-up process of the system in this example. The processor module(s) of a system resets in operational block 302. In operational block 303, the processor module(s) execute through PAL, as described above for the typical boot-up process of an IPF processor. As also described above, the boot-up process eventually executes its way into SAL space. That is, control is passed from PAL to SAL, wherein SAL executes in block 304. In this embodiment, SAL examines a configuration parameter stored to non-volatile data storage (e.g., device tree 203 of FIG. 2), wherein such configuration parameter is associated with the processor module(s) booting up and indicates whether lockstep mode is desired for the corresponding processor module(s). As described above in the example of Table 1, a configuration parameter may be associated with each processor module of the system, where each configuration parameter indicates whether its corresponding processor module is to operate in lockstep mode.

As described above, in certain embodiments, the configuration parameter(s) can be dynamically changed within the system. For instance, a user (e.g., system administrator) may interact with a graphical user interface to change the configuration parameter(s) as desired, in certain embodiments. Additionally or alternatively, application programs or processes may, in certain embodiments, be implemented to access the non-volatile data storage and change the configuration parameter(s) stored thereto under certain circumstances (e.g., based on certain conditions becoming true). In certain embodiments, access to the configuration parameter data may be restricted to only authorized personnel (e.g., system administrator) and/or authorized programs/processes. Of course, any techniques now known or later developed for accessing, changing, protecting, and/or otherwise managing configuration data may be employed for the configuration parameter(s) as desired.

The SAL firmware layer determines in block 305 whether the current lockstep mode of the processor module(s) matches the lockstep mode of operation desired for the processor module(s). Again, in certain embodiments, this determination can be made on a processor module-by-processor module basis. For instance, if the configuration parameter of a given processor module specifies that lockstep mode of operation is desired to be enabled, the SAL firmware layer determines in block 305 whether the lockstep mode of operation is currently enabled for the given processor module. A PAL call may be made to check the processor's hardware configuration to determine whether such processor is currently configured with lockstep mode enabled. In certain embodiments, a configuration parameter may be provided on a per partition basis to indicate whether lockstep mode is desired to be enabled for all processors of the corresponding partition. Thus, the determination made by SAL in block 305 may, in certain embodiments, determine whether the lockstep mode of all processors of a given partition matches the lockstep mode that is desired for the partition that is booting up.

If determined in block 305 that the current lockstep mode of the processor module(s) matches their respective desired lockstep mode, operation advances to block 306 whereat the normal SAL system initialization is performed. That is, because the processor module is configured in the desired mode of operation, the system initialization process continues. However, if determined in block 305 that the current lockstep mode of a processor module does not match the desired lockstep mode of that processor module, then operation advances to block 307 where SAL calls PAL to set the desire lockstep mode of the processor module. For instance, if desired that the processor module's lockstep mode be enabled and such processor's lockstep mode is determined as disabled, then PAL is called to turn on the lockstep mode for the processor module. If desired that the processor module's lockstep mode be disabled and such processor's lockstep mode is determined as enabled, then PAL is called to turn off the lockstep mode for the processor module. Then, in block 308, SAL verifies that all of the processor modules are configured properly (as specified by the configuration parameter(s)), and the firmware triggers a reset of the processor modules. Thus, operation returns to block 302 whereat the processor modules reset. Operational blocks 303 and 304 are again performed. However, this pass through the operational flow will result in continuing with the normal SAL system initialization in block 306 because it will be determined in block 305 that the processor modules have the desired lockstep operating mode.

While a specific example operational flow is shown above for an IPF architecture, it should be understood that embodiments herein are not limited to this illustrated operational flow or to an IPF processor architecture. Rather, this is intended solely as an example of a specific application of the concept described herein.

The embodiments provided herein advantageously enable a system to change the configuration of lockstep mode of a processor module. That is, the system can, based on configuration parameters stored to non-volatile data storage (e.g., NVRAM), selectively enable or disable lockstep mode of operation of a processor module. In modern computing environments, manufactures typically do not know how the processor module should be configured at fabrication or install time. Embodiments provided herein enable a customer (e.g., system administrator) to choose to enable or disable the lockstep operating mode of a processor module as desired (e.g., as their computing requirements change). Requiring hardware to be changed or physically manipulated by a field service person to obtain the desired configuration would be undesirably expensive and/or time consuming in most cases. Thus, embodiments provided herein beneficially provide flexibility and allow customers to configure lockstep mode on processors that support it at any time. For instance, processor lockstep mode can be configured/deconfigured at any time from a user interface with just a reboot, in accordance with the example embodiments described above.

What is claimed is:

1. A system comprising:
a processor module that supports lockstep mode of operation;
non-volatile data storage having stored thereto configuration information specifying whether said processor module is desired to operate in said lockstep mode;
firmware operable to access said non-volatile data storage during boot-up of said system and determine from said configuration information whether lockstep mode of operation is desired for said processor module;
said firmware further operable to determine whether a current mode of operation of said processor module is consistent with the desired mode of operation specified by said configuration information; and
if determined that said current mode of operation is not consistent with the desired mode of operation specified by said configuration information, said firmware further operable to change said current mode of operation of said processor module to be consistent with said desired mode of operation specified by said configuration information.

2. The system of claim 1 further comprising:
firmware operable to access said configuration information and determine whether said lockstep mode of operation is desired for said processor module.

3. The system of claim 2 wherein said firmware is further operable to ensure that the processor module enables said lockstep mode of operation if determined that said lockstep mode of operation is desired.

4. The system of claim 3 wherein said processor module includes two processors that operate in lockstep mode if said lockstep mode of operation is enabled for said processor module.

5. The system of claim 2 wherein said firmware is further operable to ensure that the processor module does not enable said lockstep mode of operation if determined that said lockstep mode of operation is not desired.

6. The system of claim 5 wherein said processor module includes two processors that operate independently if said lockstep mode of operation is not enabled for said processor module.

7. The system of claim 1 further comprising:
a user interface operable to receive information indicating whether said processor module is desired to operate in said lockstep mode.

8. The system of claim 7 further comprising:
an application operable to store said configuration information to said non-volatile data storage, wherein said configuration information is stored to said non-volatile data storage consistent with said information received by said user interface.

9. The system of claim 1 further comprising:
firmware operable to access said non-volatile data storage during boot-up of said system and enable lockstep mode for said processor module if said configuration information specifies that operating in lockstep mode is desired for said processor module.

10. The system of claim 1 further comprising:
firmware operable to access said non-volatile data storage during boot-up of said system and disable lockstep mode for said processor module if said configuration information specifies that operating in lockstep mode is not desired for said processor module.

11. A system comprising:
a processor module that is configurable to have a lockstep mode of operation enabled or disabled;
means for storing configuration information that specifies whether lockstep mode of operation is desired to be enabled or disabled for said processor module;
means for configuring said processor module to have its lockstep mode of operation enabled or disabled according to said configuration information;
means for accessing said configuration information;
means for determining from said configuration information whether said lockstep mode of operation is desired to be enabled for said processor module;
means for determining whether a current mode of operation of said processor module is consistent with the desired mode of operation specified by said configuration information; and
means, responsive to determining that said current mode of operation is not consistent with the desired mode of operation specified by said configuration information, for changing said current mode of operation of said processor module to be consistent with said desired mode of operation specified by said configuration information.

12. The system of claim 11 wherein said means for configuring further comprises:
means for enabling said lockstep mode of operation on said processor module responsive to the determining means determining that said lockstep mode of operation is desired to be enabled.

13. The system of claim 11 wherein said means for configuring further comprises:
means for disabling said lockstep mode of operation on said processor module responsive to the determining means determining that said lockstep mode of operation is desired to be disabled.

14. The system of claim 11 wherein said means for configuring configures said processor module during boot-up of said system.

15. The system of claim 11 wherein said means for configuring configures said processor module during reset of said processor module.

16. The system of claim 11 further comprising:
means for receiving as input information indicating whether lockstep mode of operation is desired to be enabled or disabled for said processor module; and
means for storing said configuration information to said non-volatile data storage consistent with said information received by the receiving means.

17. The system of claim 11 wherein said processor module is an Itanium Processor Family (IPF) processor module.

18. A method comprising:
storing configuration information to non-volatile data storage of a system, wherein said configuration information specifies whether lockstep mode of operation is desired to be enabled or disabled for a processor module of said system; and causing, by said system, the processor module to have its lockstep mode enabled or disabled as specified by said configuration information;

determining if the processor module has lockstep mode of operation enabled;

determining if said configuration information specifies that said lockstep mode of operation is desired to be enabled; and if determined that the processor module has lockstep mode of operation enabled and determined that said configuration information specifies that said lockstep mode of operation is desired to be enabled, then allowing said processor module to continue as is.

19. The method of claim 18 wherein said causing comprises:

causing the processor module to boot up with its lockstep mode enabled if said configuration information specifies that said lockstep mode of operation is desired to be enabled for the processor module.

20. The method of claim 18 wherein said causing comprises:

causing the processor module to boot up with its lockstep mode disabled if said configuration information specifies that said lockstep mode of operation is desired to be disabled for the processor module.

21. The method of claim 18 further comprising:

determining, by said system, from said configuration information whether lockstep mode of operation is desired to be enabled or disabled for the processor module.

22. The method of claim 18 wherein said causing comprises:

determining if the processor module has lockstep mode of operation enabled;

determining if said configuration information specifies that said lockstep mode of operation is desired to be enabled; and if determined that the processor module has lockstep mode of operation disabled and determined that said configuration information specifies that said lockstep mode of operation is desired to be enabled, then causing said processor module to enable its lockstep mode of operation.

23. A method comprising:

storing configuration information to non-volatile data storage of a system, wherein said configuration information specifies whether lockstep mode of operation is desired to he enabled for a processor module of said system;

during boot-up of said system, system firmware determining whether said processor module has its lockstep mode of operation configured consistent with said configuration information; and if determined that said processor module is not configured consistent with said configuration information said firmware causing the processor module to change its lockstep mode configuration.

24. The method of claim 23 wherein said firmware causing the processor module to change its lockstep mode configuration further comprises:

said firmware causing the processor module to change its lockstep mode configuration to be consistent with said configuration information.

25. The method of claim 23 further comprising:

if determined that the processor module is configured consistent with said configuration information, then allowing said processor module to continue as is.

* * * * *

UNITED STATES PATENT AND TRADEMARK OFFICE
CERTIFICATE OF CORRECTION

| | | |
|---|---|---|
| PATENT NO. | : 7,308,566 B2 | Page 1 of 1 |
| APPLICATION NO. | : 10/973004 | |
| DATED | : December 11, 2007 | |
| INVENTOR(S) | : Scott L. Michaelis et al. | |

It is certified that error appears in the above-identified patent and that said Letters Patent is hereby corrected as shown below:

In column 8, line 67, delete "1 SA" and insert -- 15A --, therefor.

In column 10, line 66, delete "modem" and insert -- modern --, therefor.

In column 11, line 58, in Claim 7, after "comprising" delete ";" and insert -- : --, therefor.

In column 14, line 15, in Claim 23, after "to" delete "he" and insert -- be --, therefor.

In column 14, line 22, in Claim 23, after "information" insert -- , --.

Signed and Sealed this

Tenth Day of June, 2008

JON W. DUDAS
*Director of the United States Patent and Trademark Office*